(12) United States Patent
Chen

(10) Patent No.: US 6,405,994 B1
(45) Date of Patent: Jun. 18, 2002

(54) FLOW CONTROL VALVE INCORPORATING AN INFLATABLE BAG

(75) Inventor: Wei-Chuan Chen, Hsin Chui (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 09/746,303

(22) Filed: Dec. 22, 2000

(51) Int. Cl.[7] .............................................. F16K 31/126
(52) U.S. Cl. ....................... 251/61.1; 251/121; 251/205; 138/93; 138/46; 137/625.3
(58) Field of Search ....................... 251/61, 61.1, 118, 251/120, 121, 205; 138/93, 41, 45, 46; 137/599.01, 625.28, 625.3

(56) References Cited

U.S. PATENT DOCUMENTS

| | | | | |
|---|---|---|---|---|
| 329,773 A | * | 11/1885 | Perry ........................... | 138/93 |
| 2,857,933 A | * | 10/1958 | Lithun .......................... | 138/93 |
| 3,320,750 A | * | 5/1967 | Haise et al. ............... | 251/61 X |
| 3,367,362 A | * | 2/1968 | Hoffman .................... | 138/46 X |
| 3,595,255 A | * | 7/1971 | Mulinex .................. | 134/167 C |
| 4,429,568 A | * | 2/1984 | Sullivan .................... | 138/93 X |
| 4,522,116 A | * | 6/1985 | Tartaglino ............... | 251/61.1 X |
| 4,672,988 A | * | 6/1987 | Tash ....................... | 251/61.1 X |
| 4,679,579 A | * | 7/1987 | Megee et al. ............. | 138/41 X |
| 4,787,408 A | * | 11/1988 | Twerdochlib .......... | 251/61.1 X |
| 5,603,454 A | * | 2/1997 | Knapp et al. ........... | 251/61.1 X |
| 5,799,700 A | * | 9/1998 | Teh et al. ...................... | 138/45 |
| 5,934,311 A | * | 8/1999 | Brown ................... | 251/61.1 X |

* cited by examiner

Primary Examiner—Kenneth Bomberg
Assistant Examiner—Eric Keasel
(74) Attorney, Agent, or Firm—Randy W. Tung

(57) ABSTRACT

A flow control valve which does not utilize any moving components in the valve is disclosed. In the flow control valve, a valve housing that has a cylindrical-shaped wall is first provided. Inside the valve housing, is then provided a first and a second end plate for sealingly engaging an inner periphery of the valve housing. The first and the second end plate are positioned spaced-apart in a predetermined distance while each of the end plates has at least one aperture therethrough for the passage of a fluid flow to be controlled. Inside a valve cavity formed between the two end plates and the inner periphery of the valve housing is positioned an inflatable bag such that when a fluid is flown into the inflatable bag, the bag inflates to either partially block or completely block the fluid passageway through the valve cavity.

20 Claims, 4 Drawing Sheets

FLOW CONTROL VALVE INCORPORATING AN INFLATABLE BAG

FIELD OF THE INVENTION

The present invention generally relates to a flow control valve and more particularly, relates to a flow control valve that contains no moving parts other than an inflatable bag positioned in a cavity of the valve.

BACKGROUND OF THE INVENTION

In a manufacturing facility, various chemicals in gaseous and liquid form are used in various fabrication processes. For instance, in a semiconductor fabrication plant, a semi-conducting substrate must be processed in a multiplicity of manufacturing steps, i.e., as many as several hundred in order to complete an integrated circuit chip. The multiplicity of manufacturing steps may include cleaning, cooling, deposition, etching and any other necessary processing steps. A variety of chemicals, including liquids and gases must be used in these steps. For instance, to clean or cool a process chamber or a wafer platform, to etch a specific feature on a substrate, to clean after each etching or deposition steps, to deposit layers of materials on a substrate, or to carry out any other processes.

The variety of chemicals used in a semiconductor facility must be handled with care since some of the processing chemicals are highly toxic and/or highly corrosive. For instance, strong acids are frequently used in an etcher for the etching of metals for forming a conductive path. Since hazardous materials are not always all consumed in chemical processes, unused hazardous chemicals must be recycled or otherwise disposed of. Due to their hazardous nature, the materials must be carefully handled during their storage and transportation to avoid personal injuries and potential fire hazard. The mechanical components used in transporting these materials should therefore be minimized such that potential exposure of personnel to the chemicals may be reduced.

Since a large number of chemicals utilized in a semiconductor fabrication facility are of the flammable or toxic nature, i.e., other than those inert gases normally utilized as purge or carrier gases, the storage and transporting of such chemicals are important aspects in the management of a fabrication facility. For instance, to avoid fire, explosion and serious personal injuries, a flammable or toxic gas must be securely stored in a safe storage facility. The storage of these gases is usually kept away from the plant personnel and thus, away from the processing equipment where they will be used. The transporting or delivery of these gases to a processing equipment therefore becomes another important aspect in the management of a fabrication plant.

A typical gas delivery system utilized in a semiconductor fabrication facility is shown in FIG. 1. The system 10 includes a main process gas input line 12 and a main purge gas supply line 14. A process gas, after being fed into the main process gas input line 12, is transported through a two-way air actuated valve 16 into a main process gas supply line 18. Off the main process gas supply line 18, a number of two-way, diaphragm-type (hereinafter, diaphragm) control valves 20 are utilized to feed the process gas from the main supply line 18 into a three-way diaphragm control valve 24. Into the three-way diaphragm control valve 24, a purge gas is also fed from the main purge gas supply line 26 into a second gas inlet 23 of the three-way diaphragm control valve 24. The purge gas, i.e., an inert gas, fed through the inlet 28 is then mixed with the process gas fed through the inlet 22 and outputted from outlet 32 of the three-way diaphragm control valve 24. It should be noted that in the above example, the purge gas is utilized as a carrier gas for the process gas. The purge gas may also be used alone for purging the gas line without the process gas. In such application, the three-way diaphragm control valve is adjusted such that only inlet 28 is connected to outlet 32 of the valve, while inlet 22 is shut-off.

When the purge gas is used as a carrier gas, the gas mixture is sent through a gas pressure regulator 36, a pressure transducer 38 into a second three-way diaphragm control valve 42 through inlet 40. The process gas/carrier gas mixture then exits from either outlet 46 or 48 and is fed into a process equipment. It should be noted that in FIG. 1, the process equipment and the gas lines feeding to the process equipment are not shown for simplicity reasons. When the gas outlets 46, 48 are not connected to a process equipment or to a gas delivery line, the outlets 46, 48 are capped by a cap 50. In the gas distribution system 10 shown in FIG. 1, the main process gas input line 18 is further provided with an expansion valve 60. The expansion valve 60 is provided such that other gas output lines may be connected thereto allowing future expansion of processing equipment in the fab facility. The outlets 62, 64 are also capped by caps 66 when the expansion valve 60 is not in use for add-on additional gas supply lines.

In the gas distribution system 10, it is seen that a number of two-way or three-way diaphragm-type control valves, i.e., 20, 24 and 42 are utilized for controlling the flow of various gases, including those of the flammable or toxic nature or vacuum in the supply lines. The control valves are equipped with control handles mounted on top of the valves such that a handle may be turned either clockwise or counterclockwise to close or open the gas passage.

FIG. 1A illustrates a cross-sectional view of an automated diaphragm valve 26 without the manually operated handle. It is seen that the diaphragm valve 26 is constructed with several moving parts, for instance, a spring 30, a control diaphragm 34, a spindle 44 and a sealing diaphragm 52. Any of the moving parts 30,34,44 and 52 may fail during the operation of the valve 26 and therefore cause serious problems for the fluid supply system 10. It is therefore desirable to provide a flow control valve for controlling fluid used in semiconductor fabrication that is essentially without any moving parts and therefore is more reliable in operation.

It is therefore an object of the present invention to provide a flow control valve that does not have the drawbacks or shortcomings of the conventional flow control valves.

It is another object of the present invention to provide a flow control valve that utilizes a minimum number of moving parts inside the valve.

It is a further object of the present invention to provide a flow control valve that can be advantageously used in semiconductor fabrication processes.

It is another further object of the present invention to provide a flow control valve that does not utilize any moving parts.

It is still another object of the present invention to provide a flow control valve for use in semiconductor manufacturing by utilizing an inflatable bag in a cavity of the valve.

It is yet another object of the present invention to provide a flow control valve by enclosing in a cavity formed by two end plates in a cylindrical-shaped housing and providing apertures in the end plates and an inflatable bag in the cavity.

It is still another further object of the present invention to provide a flow control valve that incorporates an inflatable bag wherein the bag does not substantially block a fluid flow passageway in the cavity of the valve when deflated but blocks the fluid flow passageway completely when inflated.

It is yet another further object of the present invention to provide a flow control valve incorporating an inflatable bag wherein the bag may be inflated by $N_2$, air, water or oil.

SUMMARY OF THE INVENTION

In accordance with the present invention, a flow control valve for use in a fluid flow supply system that does not contain moving parts in relation to the valve housing is disclosed.

In a preferred embodiment, a flow control valve is provided which includes a valve housing that has a cylindrical-shaped wall, a first and a second end plate sealingly engaging an inner periphery of and positioned spaced-apart in the valve housing, each of the two end plates has at least one aperture therethrough; a valve cavity formed in-between the two end plates and an inner periphery of the valve housing defining a fluid passageway therein; and an inflatable bag positioned inside the valve cavity in fluid communication with a fluid inlet tube such that when a fluid is flown through the fluid inlet tube into the inflatable bag, the bag inflates to partially block or completely block the fluid passageway in the valve cavity.

In the flow control valve, the inflatable bag may be fabricated of a corrosion-resistant elastomer, or fabricated of an elastomer that comprises fluorosilicone. The valve housing may be fabricated of a corrosion-resistant material or stainless steel. The first and the second plate may have a plurality of apertures therethrough each has a diameter less than 1 cm. The valve housing may further include an inlet and an outlet each adapted for connecting to a fluid conduit, or an inlet and an outlet each equipped with a quick-connect-disconnect fitting. The fluid inlet tube penetrates through one of the two end plates for inflating the inflatable bag, or the fluid inlet tube penetrates through one of the two end plates and the cylindrical-shaped wall of the valve housing for feeding a fluid into the inflatable bag. The cylindrical-shaped wall of the valve housing may have a diameter between about 1 cm and about 10 cm. The inflatable bag may be inflated by a fluid selected from the group consisting of $N_2$, air, water and oil. The inflatable bag may be inflated by $N_2$ to a pressure inside the inflatable bag between about 0.5 $Kg/cm^2$ and about 25 $Kg/cm^2$. The at least one aperture may have a diameter between about 0.1 cm and about 1 cm. The cylindrical-shaped wall of the valve housing may have a diameter of at least 2 cm and the first and second end plates being positioned spaced-apart by at least 2 cm.

The present invention is further directed to a flow control valve which incorporates an inflatable bag therein that is constructed by a tubular-shaped valve housing that has an inlet end and an outlet end; two end plates positioned perpendicular to and space-apart in the valve housing defining a cavity therein-between, each of the end plates may be provided with a plurality of apertures; and an inflatable bag positioned inside the cavity, the bag does not substantially block a fluid flow path in the cavity when deflated, but blocks the fluid flow path completely when inflated by a flu-d medium flown into the bag through an inlet tube.

In the flow control valve incorporating an inflatable bag therein, the plurality of apertures may each have a diameter between about 0.1 cm and about 1 cm. The tubular-shaped valve housing and the two end plates may be fabricated of a corrosion-resistant material. The inflatable bag may be fabricated of a corrosion-resistant elastomer. The fluid medium used in inflating the inflatable bag may be selected from the group consisting of $N_2$, air, water and oil.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a flow control valve that is not constructed by any moving parts but instead, incorporates an inflatable bag in a cavity of the valve. The present invention flow control valve, while is applicable to any fluid control situation, is particularly suited in controlling fluid flow in microelectronic fabrication processes.

The present invention flow control valve can be advantageously constructed by a valve housing that has a cylindrical-shaped sidewall; a first and a second end plate for sealingly engaging an inner periphery of the cylindrical-shaped wall wherein the end plates are positioned spaced-apart, each of the two end plates has at least one aperture therethrough for the passage of a fluid flow to be controlled; a valve cavity formed in-between the two end plates and an inner periphery of the valve housing defining a fluid passageway therein; and an inflatable bag positioned inside the valve cavity in fluid communication with a fluid inlet tube such that when a fluid is flown through the fluid inlet tube into the inflatable bag, the bag inflates to partially block or completely block the fluid passageway in the valve cavity.

The present invention further discloses a flow control valve which does not contain any moving components in relation to other parts of the valve, but instead, only contains an inflatable bag that inflates and moves against itself. The valve is constructed by a tubular-shaped valve housing which has an inlet end and an outlet end adapted for connecting to fluid conduits. The inlet end and the outlet end may further be provided with a quick-connect/disconnect fitting for easier assembly or disassembly of the fluid control valve in a fluid flow control system. The inflatable bag, which is positioned inside a cavity of the valve housing, may be inflated to any desirable pressure and therefore to any desirable volume to either partially or completely block a fluid flow passageway through the cavity of the valve.

Suitable fluid medium such as $N_2$, air, water and oil may be used to inflate the inflatable bag of the present invention flow control valve.

In general, the flow control valve of the present invention should be fabricated of a corrosion-resistant material such that the flow control valve can be used to control the flow of any fluid, particularly including those toxic or corrosive fluids frequently used in semiconductor fabrication processing.

Figure 1:
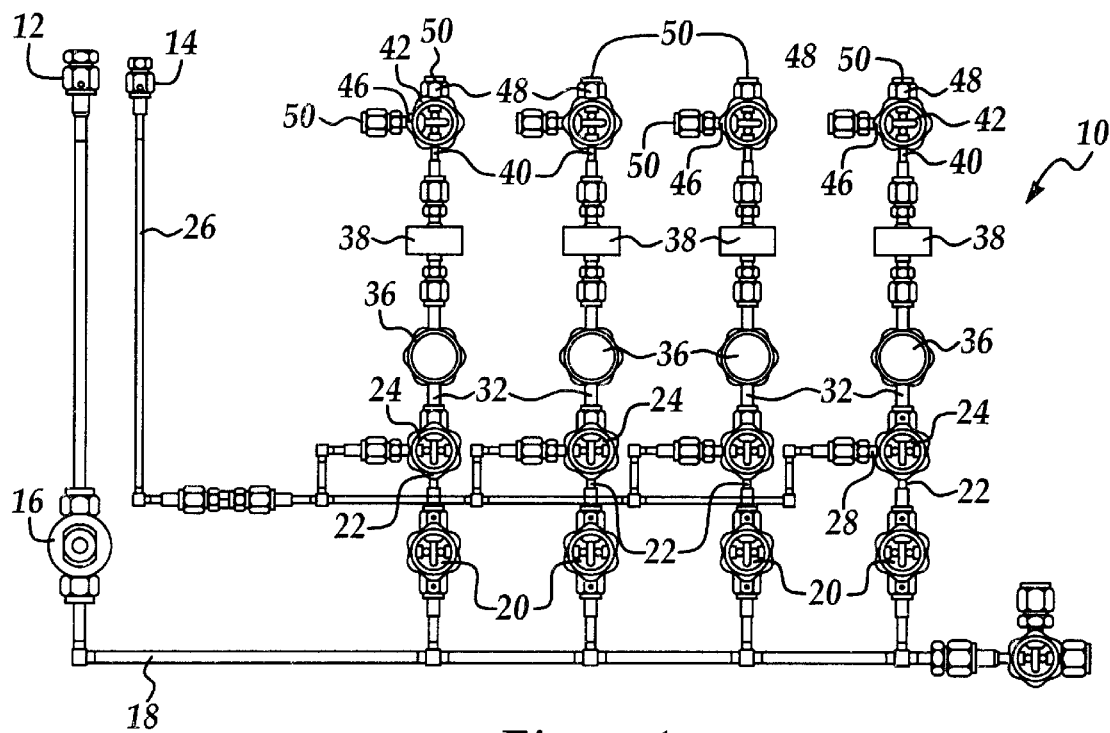
FIG. 1 is a graph illustrating a conventional fluid flow control system utilizing diaphragm flow control valves.
Figure 1A:
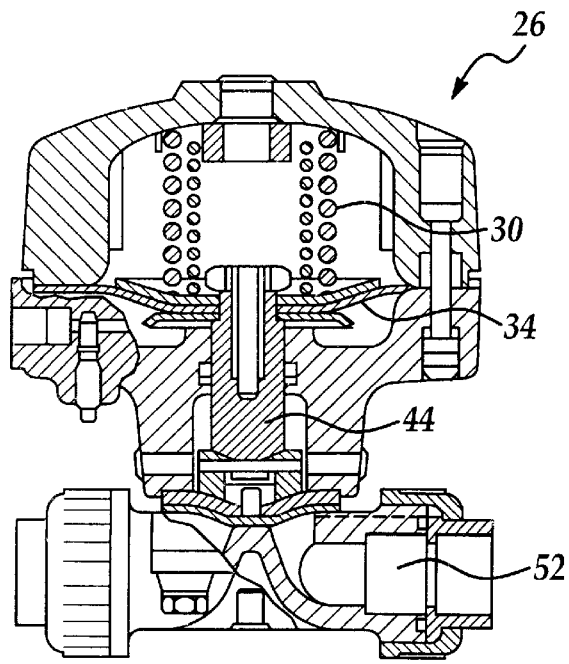
FIG. 1A is a cross-sectional view of an air-operated diaphragm-type flow control valve.
Figure 2A:
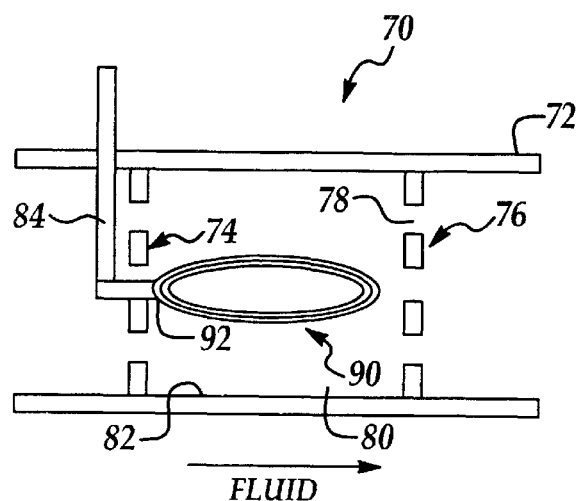
FIG. 2A is a cross-sectional view of a present invention flow control valve incorporating an inflatable bag in the cavity of the valve.
Figure 2B:
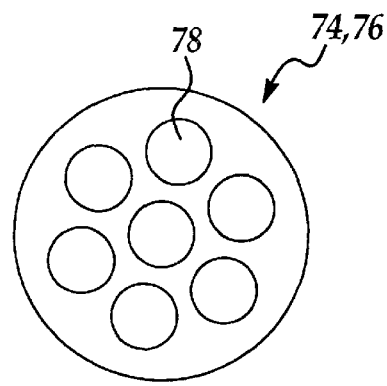
FIG. 2B is a plane view of an end plate utilized in the present invention flow control valve.

Referring now to FIG. 2A, wherein a cross-sectional view of a present invention flow control valve 70 is shown. Flow control valve 70 is constructed by a cylindrical-shaped wall 72, or a tubular-shaped wall. A first end plate 74 and a second end plate 76 are positioned inside the valve housing 72 in a perpendicular relationship to the sidewall of the valve housing. The first end plate 74 and the second end plate 76 are further positioned at a predetermined, spaced-apart relationship. In the first and second end plates 74,76, as shown in a plane view in FIG. 2B, a plurality of apertures 78 is provided. It should be noted that any suitable combination, for instance of one aperture or more, may be utilized depending on the specific control requirement and the environment in which the flow control valve is operated. For instance, a suitable number of the plurality of apertures 78 may be, as shown in FIG. 2B, seven apertures each having a diameter in-between about 0.1 cm and about 1 cm. The word "about" used in this writing indicates a range of ±10% from the average value given.

The valve housing 72 of cylindrical-shape may be fabricated of a corrosion-resistant material, for instance, of stainless steel or Teflon The end plates 74, 76 are further fabricated of a corrosion-resistant material such as stainless steel, teflon or any other corrosion-resistant polymeric material such that any fluid flow may be used in the present invention novel flow control valve 70.

Into a cavity 80 of the valve housing 72, defined by the two end plates 74,76 and an interior surface 82 of the cylindrical-shaped wall, is positioned an inflatable bag 90 that is also fabricated of a resilient, corrosion-resistant material. While any resilient, corrosion-resistant elastomeric material may be suitable, a fluorosilicon elastomer was used in producing the inflatable bag used in the preferred embodiment. The inflatable bag 90 may have an inlet 92 which is connected to a fluid inlet tube 84 for feeding a fluid medium such as $N_2$, air, water and oil into the inflatable bag 90. It should be noted that the fluid inlet tube 84 penetrates through the end plate 74 and the valve housing 72.

Figure 3:
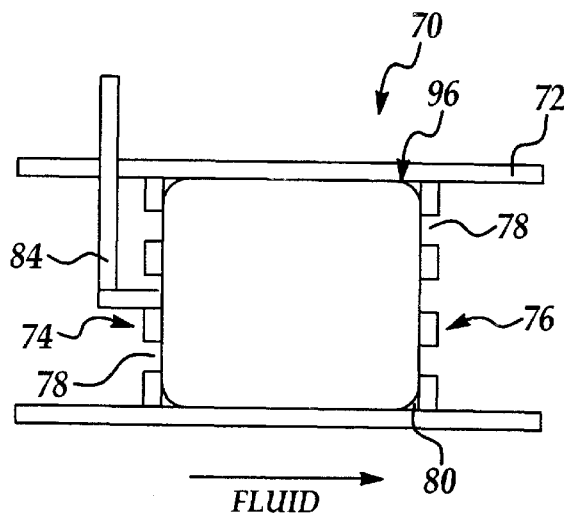
FIG. 3 is a cross-sectional view of the present invention flow control valve with the inflatable bag in a fully inflated condition.
Figure 5:
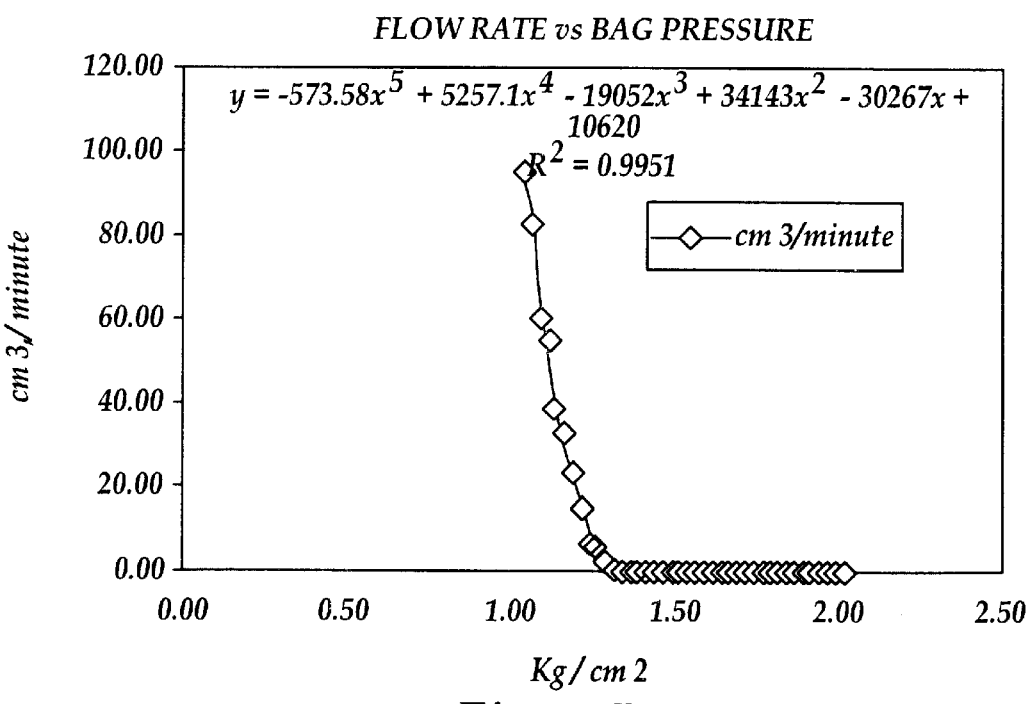
FIG. 5 is a graph illustrating the dependency of a fluid flow rate through the flow control valve on the pressure in the inflatable bag.

When a fluid medium is flown into the inflatable bag 90 and therefore fully inflates the bag, as shown in FIG. 3, the inflated bag 96 completely blocks the fluid passageway provided in cavity 80 of the flow control valve 70. It is seen in FIG. 3, all the apertures 78 in the end plates 74,76 are blocked by a wall of the inflatable bag 90. In the condition shown in FIG. 3, the fluid passageway in the cavity 80 of the valve housing 72 is completely blocked and therefore the flow control valve acts as an on/off valve to either completely open or completely block the fluid passageway. However, it should be noted that, the present invention novel flow control valve may also be used to partially block the fluid passageway in the valve housing such that a suitable flow rate of the fluid flow can be adjusted. This is shown in FIG. 5, wherein a fluid flow rate through the cavity 80 of the valve housing 72 decreases from about 100 cm$^2$/min. to about 0 cm$^2$/min. in-between a bag inflation pressure of about 1.0 Kg/cm$^2$ and about 1.35 Kg/cm$^2$.

Figure 4:
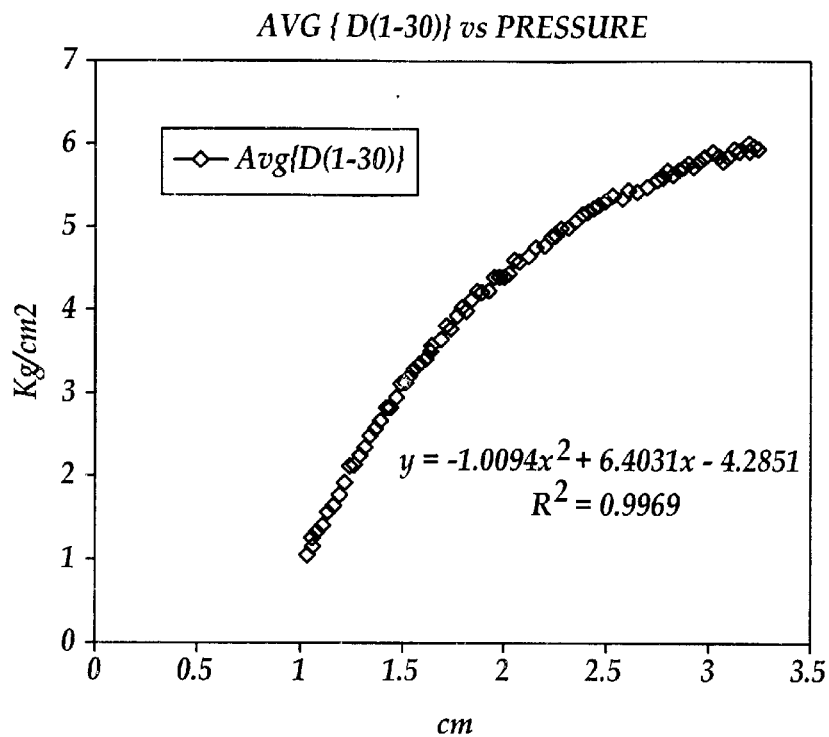
FIG. 4 is a graph illustrating the dependency of an air pressure in the inflatable bag on the diameter of the bag.

A graph illustrating the air pressure in Kg/cm$^2$ in the inflatable bag 90 versus the diameter of the bag in centimeters is shown in FIG. 4. When the inflatable bag 90 is fully inflated to a diameter of about 3 cm, which is the internal diameter of the cylindrical-shaped wall of the valve housing 72, the air pressure in the inflatable bag is about 6 Kg/cm$^2$. The dependency of the air pressure in the bag on the diameter of the bag depends on other parameters such as the type of the elastomeric material and the thickness of the inflatable bag. The data shown in FIGS. 4 and was obtained on inflatable bag fabricated of a fluorosilicon elastomer in the present invention preferred embodiment.

In the preferred embodiment, a suitable diameter of the valve housing of about 1.25 inch is utilized, while a suitable distance between the two end plates is also about 1.25 inches. Any other suitable dimension, such as an internal diameter of the valve housing between about 1 cm and about 10 cm may be utilized. The distance between the end plates may be similar to the diameter of the valve housing.

Figure 6A:
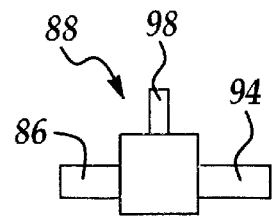
FIGS. 6A–6D are implementation examples for utilizing the present invention flow control valve incorporating an inflatable bag.

A series of four implementation examples are shown in FIGS. 6A, 6B, 6C and 6D. FIG. 6A indicates an application of the present invention novel flow control valve used as an on/off switch wherein a fluid source is provided to an inlet end 86 of the flow control valve 88 which is equipped with an inflatable bag (not shown). When the inflatable bag is in a deflated condition, fluid flows through the flow control valve 88 from the outlet end 94 controlled by a signal source 98. The valve 88 is therefore being used as an on/off switch for the fluid flow.

Figure 6B:
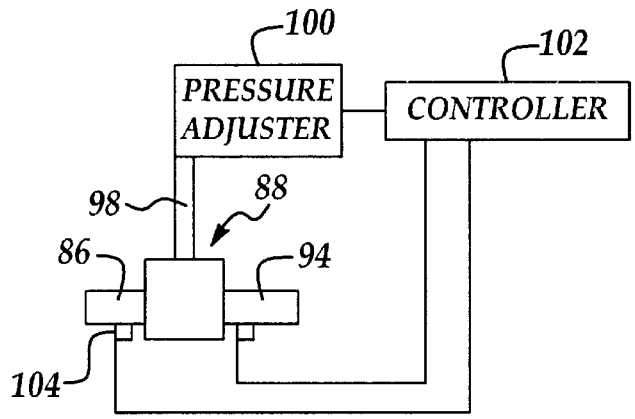

FIG. 6B illustrates another implementation example of the present invention flow control valve 88 wherein a pressure adjuster 100 and a controller 102 are provided. In this example, a flow rate command is first inputted to the controller 102, a signal source pressure and a bag volume relationship equation is then compared to a detected value by the pressure sensor 104. The volume of the inflatable bag is then changed accordingly by changing the pressure in the bag until the output from the outlet end 94 equals to the preset, desirable flow rate.

Figure 6C:
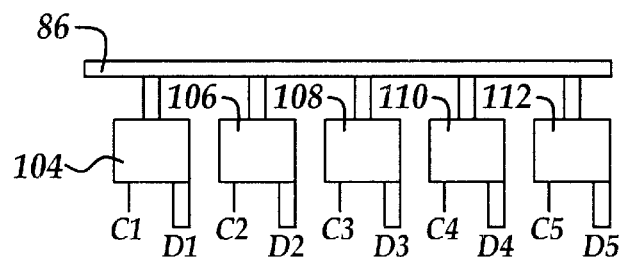

In the third implementation example shown in FIG. 6C, a series of the present invention flow control valves 104, 106, 108, 110 and 112 are utilized for controlling a fluid flow from the source 86. For instance, when C1 is on, the source D1 is also on. When C2 is on, the source D2 is also on. When C1 is off, the source D1 is also off. When C2 is off, the source D2 is also off. Similar relationship on the other flow control valves may be similarly derived.

Figure 6D:
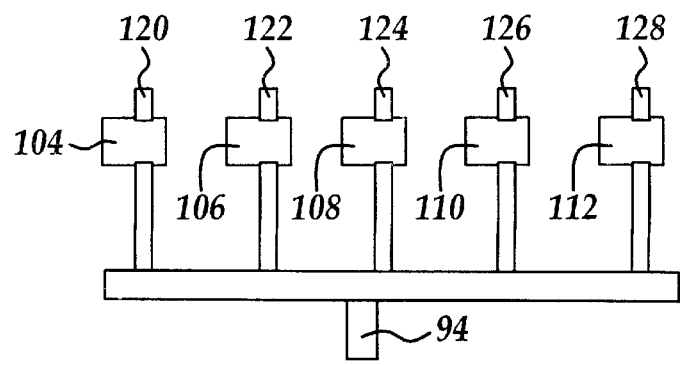

Another implementation example of a mixer of fluid flows 1 is shown in FIG. 6D, wherein a mixture exits the outlet 94 may be achieved. Each fluid flow component 120, 122, 124, 126 and 128 may be fed in and controlled by the individual flow control valves 104, 106, 108, 110 and 112.

The present invention novel flow control valve and various implementation examples for utilizing the valve have therefore been amply described in the above description and in the appended drawings of FIGS. 2A~6D.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. A flow control valve comprising:
   a valve housing having a cylindrical-shaped wall;
   a first and a second end plate sealingly engaging an inner periphery of and positioned spaced-apart in said valve housing, each of said two end plates having at least one aperture therethrough;

a valve cavity formed in-between said two end plates and an inner periphery of said valve housing defining a fluid passageway therein; and an inflatable bag positioned inside said valve cavity in fluid communication with a fluid inlet tube such that when a fluid is supplied through said fluid inlet tube into said inflatable bag, said bag inflates to partially block or completely block said fluid passageway in said valve cavity.

2. A flow control valve according to claim 1, wherein said inflatable bag is fabricated of a corrosion-resistant elastomer.

3. A flow control valve according to claim 1, wherein said inflatable bag is fabricated of an elastomer that comprises fluorosilicon.

4. A flow control valve according to claim 1, wherein said valve housing is fabricated of a corrosion-resistant material.

5. A flow control valve according to claim 1, wherein said valve housing is fabricated of stainless steel.

6. A flow control valve according to claim 1, wherein said first and second end plates have a plurality of apertures therethrough each having a diameter less than 1 cm.

7. A flow control valve according to claim 1, wherein said valve housing further comprises an inlet and an outlet each adapted for connecting to a fluid conduit.

8. A flow control valve according to claim 1, wherein said valve housing further comprises an inlet and an outlet each equipped with a quick-connect-disconnect fitting.

9. A flow control valve according to claim 1, wherein said fluid inlet tube penetrates through one of said two end plates for inflating said inflatable bag.

10. A flow control valve according to claim 1, wherein said fluid inlet tube penetrates through one of said two end plates and said cylindrical-shaped wall of the valve housing for supplying said fluid into said inflatable bag.

11. A flow control valve according to claim 1, wherein said cylindrical-shaped wall of the valve housing has a diameter between about 1 cm and about 10 cm.

12. A flow control valve according to claim 1, wherein said inflatable bag is inflated by a fluid selected from the group consisting of $N_2$, air, water and oil.

13. A flow control valve according to claim 1, wherein said inflatable bag is inflated by $N_2$ to a pressure inside the inflatable bag between about 0.5 $Kg/cm^2$ and about 25 $Kg/cm^2$.

14. A flow control valve according to claim 1, wherein said at least one aperture has a diameter between about 0.1 cm and about 1 cm.

15. A flow control valve according to claim 1, wherein said cylindrical-shaped wall of the valve housing has a diameter of at least 2 cm and said first and second end plates being positioned spaced-apart by at least 2 cm.

16. A flow control valve incorporating an inflatable bag therein comprising:

a tubular-shaped valve housing having an inlet end and an outlet end;

two end plates positioned perpendicular to and spaced-apart in said valve housing defining a cavity therein-between, each of said end plates being provided with a plurality of apertures; and an inflatable bag positioned inside said cavity, said bag does not substantially block a fluid flow path in said cavity when deflated but blocks said fluid flow path completely when inflated by a fluid medium supplied into said bag through an inlet tube.

17. A flow control valve incorporating an inflatable bag therein according to claim 16, wherein said plurality of apertures each has a diameter between about 0.1 cm and about 1 cm.

18. A flow control valve incorporating an inflatable bag therein according to claim 16, wherein said tubular-shaped valve housing and said two end plates are fabricated of a corrosion-resistant material.

19. A flow control valve incorporating an inflatable bag therein according to claim 16, wherein said inflatable bag are fabricated of a corrosion-resistant elastomer.

20. A flow control valve incorporating an inflatable bag therein according to claim 16, wherein said fluid medium used in inflating said inflatable bag being selected from the group consisting of $N_2$, air, water and oil.

* * * * *